3,177,203
PENICILLIN DERIVATIVES
Moses Wolf Goldberg, Upper Montclair, and Sidney Teitel, Belleville, N.J., assignors to Hoffmann-La Roche Inc., Nutley, N.J., a corporation of New Jersey
No Drawing. Filed Dec. 8, 1961, Ser. No. 158,164
8 Claims. (Cl. 260—239.1)

This invention relates, in general, to novel derivatives of 6-acylaminopenicillanic acid. More particularly, the invention relates to N-alkoxyamide and N-aralkyloxyamide derivatives of penicillin compounds.

Benzylpenicillin is a well-known and widely used compound. However, the relative instability of this compound has, in the past, provided the impetus for many attempts to modify its structure. Phenoxymethylpenicillin and 2,6-dimethoxyphenylpenicillin can be mentioned as examples of two of the many modified penicillin products which have been developed.

The instability of benzylpenicillin is associated with the β-lactam moiety of the benzylpenicillin molecule. This moiety is readily destroyed, in solution, by acid or alkali, and also by the action of the enzyme penicillinase, leading to the substantially complete inactivation of the molecule. Many Staphylococcus strains apparently produce large amounts of penicillinase, and these strains, for the most part, have been found to be resistant to benzylpenicillin. Needless to say, the increasing incidence of benzylpenicillin resistant Staphylococcus strains presents a very pressing problem.

The object of this invention is to provide novel derivatives of pencillin.

It is a more particular object of the invention to provide derivatives of penicillin which are highly resistant to inactivation by staphylococcal penicillinase and are active against benzylpenicillin resistant Staphylococcus strains.

Other objects of the invention will be obvious and will, in part, appear hereinafter.

It has been found that compounds having the formula:

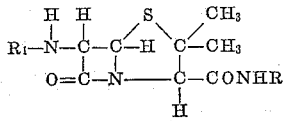

wherein $R_1$ represents an acyl radical and wherein R represents an alkoxy group or an aralkyloxy group, are highly resistant both to inactivation by Staphylococcus penicillinase and active against benzylpenicillin resistant Staphylococcus strains.

Thus, the products of our invention can be characterized either as N-alkoxyamide and N-aralkyloxyamide derivatives of 6-acylaminopenicillanic acid or as alkoxyamide and aralkyloxyamide derivatives of penicillins. The latter terminology will be used in the present specification. These products can be prepared by any one of several methods. The following, however, is a description of the procedure preferably employed. In the first step of the preferred procedure, a penicillin salt is reacted, while dissolved in a suitable solvent, with an approximately equimolar quantity of an alkyl chloroformate. This reaction yields the monoalkylcarbonate mixed anhydride of the penicillin compound employed. The mixed anhydride, without being isolated, is thereafter reacted with an alkoxyamine or an aralkyloxyamine to form the desired alkoxyamide derivative or aralkyloxyamide derivative of the penicillin compound.

As the starting material, one may use any of the known penicillin compounds. These include, for example, the preferred starting materials, namely, benzylpenicillin, phenoxymethylpenicillin and 2,6-dimethoxyphenylpenicillin. In addition, however, one may employ pentylpenicillin, heptylpenicillin, 2-pentenylpenicillin, (allylthio)-methylpenicillin, p-hydroxybenzyl penicillin, α-hydroxybenzylpenicillin, p-aminobenzylpenicillin, α-aminobenzylpenicillin, acetamidobenzylpenicillin, p-nitrobenzylpenicillin, α-methoxybenzylpenicillin, 3,4-dichloro-α-methoxybenzylpenicillin, α-phenoxymethylpenicillin, α-phenoxyethylpenicillin, α-phenoxypropylpenicillin, α-phenoxyisopropylpenicillin, α-phenoxyisobutylpenicillin, p-chlorophenoxymethylpenicillin, p-benzyl-o-chlorophenoxymethylpenicillin, p-(α,α-dimethylbenzyl)phenoxymethylpenicillin, p-benzylphenoxymethylpenicillin, p-(diphenylmethyl)phenoxymethylpenicillin, p-toluylmethylpenicillin, cyclohexyloxymethylpenicillin, 2-methoxy-1-naphthylpenicillin, 2-ethoxy-1-naphthylpenicillin, 4-amino-4-carboxybutylpenicillin, 2-carboxyphenylpenicillin, phenylthiomethylpenicillin, benzylthiomethylpenicillin, phenethylthiomethylpenicillin, styrylmercaptomethylpenicillin, as well as other such penicillin compounds.

More specifically, in carrying out our invention, a trialkylamine salt of a penicillin compound is first dissolved in a suitable solvent. Various trialkylamine salts of penicillin can be used as, for example, salts of penicillin with trialkylamines, the alkyl groups of which have a carbon chain length of from about 1 to 6 carbon atoms. Thus, for example, one may use the trimethylamine, triethylamine, tripropylamine, tributylamine, tripentylamine, trihexylamine salts of penicillin compounds, such as, benzylpenicillin, phenoxymethylpenicillin or 2,6-dimethoxyphenylpenicillin, in producing our novel products. In this step of the process, any inert organic solvent in which the penicillin salt is soluble, or at least partially soluble, can be used. Completely satisfactory results are obtained when a solvent, such as chloroform, chlorobenzene, dioxane, ethylene chloride, etc., is used. Methylene chloride, however, is the solvent preferably used in carrying out this step. While the quantity of solvent employed is not particularly critical, most satisfactory results have been obtained when the amount of solvent employed is at least sufficient to dissolve a substantial portion of the penicillin salt.

The penicillin salt is reacted with an alkyl chloroformate by mixing the respective ingredients at a temperature within the range of from about room temperature to $-10°$ C. Preferably, however, the reactants are mixed at a temperature of from about 0° C. to 10° C. The alkyl chloroformates used in the practice of this invention are those having an alkyl group of from 1 to 6 carbon atoms, inclusive. Suitable for use are methyl chloroformate, ethyl chloroformate, propyl chloroformate, isobutyl chloroformate, etc. However, ethyl chloroformate is employed in the preferred embodiment of the invention.

As indicated heretofore, the reaction of the penicillin salt and the alkyl chloroformate compound in the first step of our process yields the monoalkylcarbonate mixed anhydride of the penicillin compound employed. Without having first been isolated, this anhydride can be converted into the product of our invention. This is accomplished by adding an equimolar quantity of an alkoxyamine or an aralkyloxyamine to the anhydride reaction product of the first step and mixing same therewith. In this step, an alkoxyamine, the alkyl group of which has a carbon chain length of from about 1 to about 6 carbon atoms, inclusive, can be used. Thus, for example, one may employ N-methoxyamine, N-ethoxyamine, N-n-propoxyamine, etc. In the alternative, one may use an aralkyloxyamine, including substituted aralkyloxyamines, the alkyl groups of which have a carbon chain length of from about 1 to 6 carbon atoms, inclusive. Thus, one may use aralkyloxyamines, such as, benzyloxyamine, N-p-chlorobenzyloxyamine, N-m,p-dichlorobenzyloxyamine, phenethyloxyamine, N-p-chlorophenethyloxyamine, phenylpropyloxyamine, α-napthylmethyloxyamine, etc. The alkoxyamine or the aralkyloxyamine may be, and is preferably, introduced into the reaction system, while dissolved in a suitable organic solvent. The solvent employed, however, preferably is one which will not react with, or otherwise adversely affect, the anhydride product obtained in the first step of the process. Moreover, preferably the solvent used is one which is miscible with the solvent used in the first step of the process. Where it is possible to do so, it is preferable to use the same solvent in the second step as has been used in the first step. Thus, for example, where methylene chloride has been used as the solvent for the penicillin salt in the first step of the process, the alkoxyamine or the aralkyloxyamine which is employed in the second step is preferably introduced into the reaction mixture in the form of a methylene chloride solution. The foregoing notwithstanding, however, the alkoxyamine or the aralkyloxyamine need not be added in the form of a solvent solution. If desired, the alkoxyamine or the aralkyloxyamine may be added to the reaction mixture as is.

The reaction of the monoalkylcarbonate mixed anhydride of the penicillin compound with the alkoxyamine or aralkyloxyamine is accomplished by mixing the reactants at a temperature within the range of from about room temperature to −10° C. Preferably, the reaction is carried out at a temperature within the range of from about 0° C. to 10° C. When the reaction is complete, the temperature of the reaction mixture is allowed to increase until it reaches room temperature. If desired, the reaction mixture can be brought to room temperature by gently warming same. Thereafter, the reaction mixture is extracted with a buffer, following which the inert organic solvent layer is separated from the water layer. The organic solvent solution is then washed with the buffer and, subsequently, with water and subsequently it is then dried, for example, over sodium sulfate and filtered. The penicillin compound, thus produced, can then be separated from the solvent by any conventional means.

As indicated heretofore, the foregoing procedure represents the preferred method of obtaining the novel products of this invention. In an alternative method, the products can be produced by a procedure involving first the reaction of a trialkylamine salt of a penicillin compound, as, for example, a trialkylamine salt of benzylpenicillin, a trialkylamine salt of phenoxymethylpenicillin, a trialkyamine salt of 2,6-dimethoxyphenylpenicillin etc., with thionyl chloride. The reaction is carried out, in chloroform, at a temperature of from about −10° C. to 10° C. to yield the anhydride of the penicillin compound used. The penicillin anhydride, without having been isolated, is thereafter reacted with a suitable N-alkoxyamine or with an N-aralkyloxyamine, in the same manner as is the mixed anhydride produced in the preferred method of the invention. The product obtained by this reaction is worked up by the method of the preferred procedure.

Still another procedure for producing the present products involves the use of an N,N′-substituted carbodiimide for the formation of the amide linkage. In such a process, equimolar quantities of a penicillin compound, as the free acid, and an appropriate N-alkoxyamine or N-aralkyloxyamine are first dissolved, for example, in methylene chloride. This solution is then cooled to a temperature within the range of from about −10° C. to 10° C. and, at such temperature, an approximately molar equivalent quantity of N,N′-dicyclohexylcarbodiimide, dissolved in methylene chloride, is added thereto. The N,N′-dicyclohexylurea which is formed is of low solubility and it is removed by filtration. The filtrate is thereafter worked up by the method of the preferred procedure to obtain the desired penicillin compound.

The products of this invention have extremely useful properties. Since they are water-insoluble, neutral compounds, they are less susceptible to hydrolytic decomposition than the water-soluble penicillin salts. Moreover, the products, for example, the N-lower alkoxy-benzyl-penicillinamides, exhibit unexpected chemotherapeutic activity. In addition to having oral in vivo activity in mice against streptococci, pneumococci, and staphylococci, these compounds have been found to be active also, in vivo and in vitro, against a number of *Staphylococcus aureus* strains which are resistant to benzylpenicillin.

For a better understanding of the nature and objects of this invention, reference may be had to the following examples which are given merely as further illustrations of this invention and are not to be construed in a limiting sense.

Example 1

In this example, 88.0 grams (0.202 mole) of the triethylamine salt of benzylpenicillin was first dissolved in 1.0 liter of methylene chloride. This solution was cooled to a temperature of about 4° C. and 20.0 ml. (0.21 mole) of ethyl chloroformate was added thereto. The reaction mixture was stirred at 4° C. for about 45 minutes. Thereafter, a solution of 8.4 grams (0.179 mole) of N-methoxyamine in 500 ml. of methylene chloride was slowly added thereto. Addition of the N-methoxyamine solution was accomplished over a period of about ninety minutes, during which time the reaction mixture was continuously stirred. The temperature was maintained at about 4° C. during this period of time. When addition of the N-methoxyamine solution was complete, the reaction mixture was stirred at a temperature of about 4° C. for an additional 60 minutes. Thereafter, cooling was discontinued and the temperature of the reaction mixture was allowed to rise to room temperature.

A slightly turbid, pale yellow solution was obtained. This solution was first extracted with 0.66 molar phosphate buffer, 2 l. (pH 7.2). The methylene chloride layer was then separated from the aqueous layer. The methylene chloride layer was then washed two times, each time with a 100 ml. portion of the phosphate buffer (pH 7.2). It was subsequently washed three times, each time with 100 ml. of water, dried over anhydrous sodium sulfate and filtered. The filtrate was concentrated in vacuo at a bath temperature not exceeding 40° C. to a volume of about 600 ml. A slightly turbid, deep yellow colored concentrate was thus obtained and it was kept overnight at a temperature of 4° C. The concentrate was thereafter filtered and the filtrate evaporated to dryness at a temperature of 40° C. under water vacuum. A gum-like mass was obtained and this mass was crystallized from acetonitrile-ether. Recrystallization from acetone-water yielded 41.8 grams (64 percent of theory based on N-methoxyamine) of white crystals of N-methoxy-benzylpenicillinamide ($[\alpha]_D^{25}$ +252°, 1 precent acetone), M.P. 170–172° C., with decomposition.

*Analysis.*—Calculated for $C_{17}H_{21}N_3O_4S$: C, 56.19; H, 5.83. Found: C, 56.48; H, 5.86.

Example 2

In this example, 35.2 g. (0.081 mole) of triethylamine salt of benzylpenicillin was dissolved in 400 ml. of methylene chloride. This solution was cooled to a temperature of about 4° C. and 7.98 ml. (0.083 mole) of ethyl chloroformate was added thereto. The reaction mixture was stirred at a temperature of about 4° C. for a period of about 45 minutes. Thereafter, 4.38 g. (0.072 mole) of N-ethoxyamine, dissolved in 200 ml. of methylene chloride, was slowly added thereto. The addition of the solvent solution of N-ethoxyamine was accomplished over a period of about 90 minutes, during which time the reaction mixture was continuously stirred. The temperature of the reaction mixture was maintained at about 4° C. during the addition of the N-ethoxyamine solution. When the addition of the N-ethoxyamine solution was completed, the reaction mixture was stirred at a temperature of about 4° C. for an additional period of about 60 minutes. Thereafter, the reaction mixture was allowed to warm to room temperature.

N-ethoxy-benzylpenicillinamide was obtained from the reaction product by the method described in Example 1. The product was obtained in a yield of 21.5 g. (79% of theory based on N-ethoxyamine). It was found that N-ethoxy-benzylpenicillinamide ($[\alpha]_D^{25}$ +260°, 1% acetone) underwent gradual decomposition at temperatures within the range of from about 76° C. to 86° C.

*Analysis.*—Calculated for $C_{18}H_{23}N_3O_4S$: C, 57.28; H, 6.14. Found: C, 57.45; H, 6.57.

Example 3

In this example, N-propoxy-benzylpenicillinamide was prepared by the method described in Examples 1 and 2. In the production of this product, 17.5 grams (0.04 mole) of the triethylamine salt of benzylpenicillin was reacted with 4.0 ml. (0.042 mole) of ethyl chloroformate, dissolved in 200 ml. of methylene chloride. Moreover, in this example, 3.0 grams (0.04 mole) of N-propoxyamine dissolved in 100 ml. of methylene chloride was used.

There was obtained by this method 5.3 grams of N-propoxybenzylpenicillinamide (34% of theory based on the triethylamine salt of benzylpenicillin). This product ($[\alpha]_D^{25}$ +262°, 1% acetone) had a melting point of 135° C. to 137° C. with decomposition (from ethyl acetate-ether).

*Analysis.*—Calculated for $C_{19}H_{25}N_3O_4S$: C, 58.30; H, 6.44. Found: C, 58.28; H, 6.26.

Example 4

In this example, 14.0 grams (0.04 mole) of phenoxymethylpenicillin was suspended in 200 ml. of methylene chloride. Thereafter, 5.66 ml. (0.04 mole) of triethylamine was added thereto to produce the triethylamine salt of phenoxymethylpenicillin. The colorless solution, thus obtained, was cooled to a temperature of about 4° C. and 4.0 ml. (0.042 mole) of ethyl chloroformate was added thereto with continuous stirring. The reaction mixture was stirred at a temperature of about 4° C. for a period of about 45 minutes, during which time it developed a pink coloration. With the temperature of the reaction mixture being maintained at about 4° C., a solution of 1.7 grams (0.037 mole) of N-methoxyamine, dissolved in 100 ml. of methylene chloride, was added to the reaction mixture gradually over a two-hour period. When the addition of the N-methoxyamine solution was completed, the reaction mixture was stirred at a temperature of about 4° C. for an additional 30 minutes. At the end of this time, cooling was discontinued; but stirring was continued for an additional three hours.

The reaction product was extracted with 250 ml. of 0.66 molar phosphate buffer, having a pH of 7.2. The methylene chloride layer was separated from the aqueous layer and it was washed four times, each time using 25 ml. portions of water. The methylene chloride solution was subsequently dried over anhydrous sodium sulfate and filtered. The filtrate was concentrated in vacuo at 40° C. to a volume of 75 ml. and 300 ml. of ether was added thereto. After standing overnight at a temperature of about 4° C., the precipitate formed was filtered off, washed with ether and air dried to give 11.9 grams (85% of theory based on N-methoxyamine) of N-methoxy-phenoxymethylpenicillinamide. The product ($[\alpha]_D^{25}$ +267°, 1% acetone) melted at 89° C. to 91° C. with decomposition (from methylene chloride-ether).

*Analysis.*—Calculated for $C_{17}H_{21}N_3O_5S$: C, 53.81; H, 5.58. Found: C, 53.85; H, 5.33.

Example 5

N-methoxy-(2,6-dimethoxyphenyl)penicillinamide was prepared by the procedure described in Example 4. The trialkylamine salt of 2,6-dimethoxyphenylpenicillin used in preparing this product was obtained by acidifying 20.0 grams (0.048 mole) of sodium 2,6-dimethoxyphenylpenicillin, extracting the product with 250 ml. of methylenechloride and reacting it with 6.74 ml. (0.048 mole) of triethylamine. There was added to this solution 5.0 ml. (0.051 mole) of ethyl chloroformate. The product obtained by reacting the ethyl chloroformate with the triethylamine salt of 2,6-dimethoxyphenylpenicillin was then reacted with 2.1 grams (0.045 mole) of N-methoxyamine to yield 4.8 grams (38% of theory based on N-methoxyamine) of N-methoxy-(2,6-dimethoxyphenyl)penicillinamide. This product ($[\alpha]_D^{25}$ +266°, 1% acetonitrile) melted at a temperature of 215° C. to 216° C. with decomposition (from acetonitrile-ether).

*Analysis.*—Calculated for $C_{18}H_{23}N_3O_6S$: C, 52.81; H, 5.66; N, 10.27. Found: C, 53.19; H, 5.51; N, 10.09.

Example 6

In this example, 6.36 grams (0.04 mole) of N-benzyloxyamine hydrochloride was suspended in 15 ml. of 50% aqueous sodium chloride. The suspension was cooled to 4° C. and 15 ml. of 50% sodium hydroxide was slowly added thereto. The reaction mixture was immediately extracted four times with methylene chloride, using, respectively, 50 ml., 20 ml., 20 ml., and 20 ml. portions of the solvent. The methylene chloride extracts were decanted away from the remainder of the reaction mixture, combined, dried over potassium carbonate, filtered and the filtrate which contained N-benzyloxyamine was used, in the manner described hereinafter, in the synthesis of N-benzyloxy-benzylpenicillinamide.

To a stirred solution of 17.5 grams (0.04 mole) of the triethylamine salt of benzylpenicillin in 200 ml. of methylene chloride, cooled to a temperature of 4° C., there was added 4.0 ml. (0.042 mole) of ethyl chloroformate. The reactants were stirred at a temperature of about 4° C. for a period of about 45 minutes. Thereafter, the methylene chloride solution of N-benzyloxyamine, the preparation of which was described in the preceding paragraph, was added to the reaction mixture slowly over a period of about ninety minutes. During the addition of the N-benzyloxyamine solution, the reaction mixture was continuously stirred and maintained at a temperature of about 4° C. The reaction mixture was, moreover, stirred at a temperature of 4° C. for a period of sixty minutes after the addition of the benzyloxyamine solution had been completed. The reaction mixture was then allowed to warm to room temperature.

A yellow colored solution was thus obtained and it was extracted with 250 ml. of 0.66 molar phosphate buffer (ph 7.2). The methylene chloride layer was separated off, and it was washed first with two 50 ml. portions of the phosphate buffer and subsequently with three 50 ml. portions of water. The solution was then dried over anhydrous sodium sulfate and filtered.

The filtrate was, thereafter, evaporated to dryness in vacuo, at a both temperature not exceeding about 40° C. The residual gum was crystallized from an acetonitrile-ether mixture to yield 9.5 grams (55% of theory based on the triethylamine salt of benzylpenicillin) of N-benzyloxy-benzylpenicillinamide, melting point 104° C. to 106° C., with decomposition. Recrystallization from a mixture of ethylacetate-ether-petroleum ether yielded N-benzyloxy-benzylpenicillinamide ($[\alpha]_D^{25}$ +244°, 1% acetone) melting at 106° C. to 108° C., with decomposition.

*Analysis.*—Calculated for $C_{23}H_{25}N_3O_4S$: C, 62.84; H, 5.73. Found: C, 63.22; H, 6.37—C, 62.98; H, 6.47.

We claim:
1. A class of compounds having the formula:

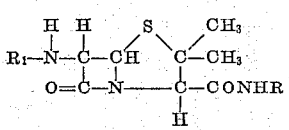

wherein $R_1$ is an acyl group selected from the class consisting of $C_6H_5CH_2CO—$, $C_6H_5OCH_2CO—$, and

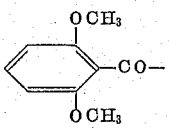

and R is a group selected from the class consisting of alkoxy having from 1 to 6 carbon atoms, inclusive, and benzyloxy.

2. N-methoxy-benzylpenicillinamide.
3. N-ethoxy-benzylpenicillinamide.
4. N-propoxy-benzylpenicillinamide.
5. N-methoxy-phenoxymethylpenicillinamide.
6. N-methoxy-(2,6-dimethoxyphenyl)pencillinamide.
7. N-benzyloxy-benzylpenicillinamide.
8. A process for producing compounds having the formula:

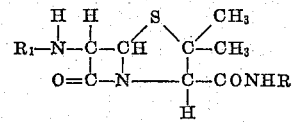

wherein $R_1$ is an acyl radical selected from the group consisting of $C_6H_5CH_2CO—$, $C_6H_5OCH_2CO—$ and

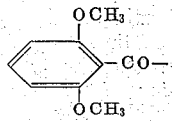

and wherein R is a radical selected from the group consisting of alkoxy having from 1 to 6 carbon atoms, inclusive, and a benzyloxy radical, which comprises mixing a trialkylamine salt of a penicillin compound, the alkyl group of said trialkylamine salt having a carbon chain length of from 1 to about 6 carbon atoms inclusive, with an alkyl chloroformate, the alkyl group of which having from 1 to about 6 carbon atoms, inclusive, and reacting the penicillin-monoalkyl carbonate mixed anhydride, thus produced, with a compound selected from the group consisting of alkoxyamines having a carbon chain length of from 1 to about 6 carbon atoms, inclusive, and benzyloxyamine.

References Cited by the Examiner

Morton: The Chemistry of Heterocyclic Compounds, page VI of the Preface, 1946.
Hackh's Chemical Dictionary, p. 21 (1937), Second Edition.
Wertheim: Textbook of Organic Chemistry, pp. 763–764 (1945).
Journal American Medical Assoc., p. 466, May 24, 1958.

IRVING MARCUS, *Primary Examiner.*
NICHOLAS S. RIZZO, WALTER A. MODANCE,
*Examiners.*